United States Patent Office 2,852,523
Patented Sept. 16, 1958

2,852,523

5,5-DIPHENYL-1,2,4-OXADIAZOLIDINE-3-ONES

Rocco Joseph Lopresti, Brooklyn, N. Y., and Sidney Robert Safir, River Edge, N. J., assignors to American Cyanamid Company, New York, N. Y., a corporation of Maine No Drawing. Application September 13, 1957
Serial No. 683,711

5 Claims. (Cl. 260—307)

This invention relates to new chemical compounds and more particularly is concerned with novel 5,5-diphenyl-1,2,4-oxadiazolidine-3-ones which may be represented by the following structural formula:

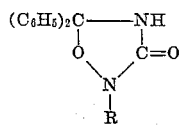

wherein R is a member of the group consisting of hydrogen and lower alkyl radicals.

The novel compounds of this invention are notable for their excellent activity as anticonvulsants combined with favorable toxicity. They have shown strong protective action against electroshock and are useful as antiepileptic drugs.

5,5-diphenyl-1,2,4-oxadiazolidine-3-one is prepared by reacting diphenylketimine with phosgene to form diphenylmethylenecarbamyl chloride, which is then reacted with hydroxylamine to form the final compound. The reaction is ordinarily conducted in a suitable hydrocarbon-water solvent system such as xylene-water, toluene-water, etc. The reaction of the diphenylketimine with phosgene is preferably carried out in the cold, that is, at temperatures from about −30° C. to 0° C. The reaction between the diphenylmethylenecarbamyl chloride and hydroxylamine is preferably carried out at room temperature, that is, temperatures of the order of 20–30° C. After the reaction is complete, the 5,5-diphenyl-1,2,4-oxadiazolidine-3-one is extracted from the crude reaction mixture in any convenient manner and is purified by recrystallization in a standard manner.

This compound may be methylated by reaction with diazomethane to form 5,5 - diphenyl - 2 - methyl - 1,2,4-oxadiazolidine-3-one. In a similar manner and by the use of appropriate reactants, other alkylated 5,5-diphenyl-2-di-lower alkyl - 1,2,4 - oxadiazolidine - 3 - ones may be prepared.

The invention will be described in greater detail in conjunction with the following specific examples.

EXAMPLE 1

*5,5-diphenyl-1,2,4-oxadiazolidine-3-one*

To a solution of 5.4 grams (0.05 mole) of phosgene in 20 cc. of toluene, there was added slowly at −20° a solution of 17.2 grams (0.095 mole) of diphenylketimine in 200 cc. of toluene. Diphenylketimine hydrochloride separated and, after standing for one hour, the mixture was filtered. The filtrate, which contained the diphenylmethylenecarbamyl chloride, was added to a solution of hydroxylamine, freshly prepared by reacting 21.2 grams (0.303 mole) of hydroxylamine hydrochloride and 24.5 grams (0.300 mole) of sodium acetate in 60 cc. of water. The mixture was stirred at room temperature for 18 hours and the layers were separated. The toluene solution was then extracted with a solution of 5.6 grams of sodium hydroxide in 300 cc. of water. The layers were separated and the alkaline solution was extracted with ether. The alkaline layer was acidified to pH 7 and the resulting solution was extracted with ether. The combined ethereal extracts were dried and evaporated to give 1.46 grams of solid; M. P. 134–147°. This crude solid was suspended in water and 1 N alkali was added until a constant pH of 11.5 was obtained. The mixture was filtered and the filtrate was acidified to pH 7 to yield 1.1 grams of colorless solid; M. P. 140–156°. Several recrystallizations of this material from benzene yielded 5.5-diphenyl-1,2,4-oxadiazolidine-3-one; M. P. 170–172° (dec.).

EXAMPLE 2

*5,5-diphenyl-2-methyl-1,2,4-oxadiazolidine-3-one*

To a solution of 240 milligrams (0.001 mole) of 5,5-diphenyl-1,2,4-oxadiazolidine-3-one in 50 cc. of methanol, there was added an ethereal solution of diazomethane until an excess was present. The resulting solution was permitted to stand overnight at room temperature and was then carefully evaporated to dryness in vacuo. There was obtained a yellow solid; M. P. 135–188°. The crude material was suspended in 3 cc. of methanol and filtered to give 100 milligrams (39.3%) of the product as a colorless solid; M. P. 204–207°. Recrystallization of this material from methanol yielded the pure 2-methyl derivative; M. P. 207–208°.

*Analysis.*—Calculated for $C_{15}H_{14}N_2O_2$: C, 70.9; H, 5.5; N, 11.0; N—$CH_3$, 5.9. Found: C, 70.9; H, 5.5; N, 11.1; N—$CH_3$, 4.72; O—$CH_3$, 0.0.

We claim:

1. 5,5 - diphenyl - 1,2,4 - oxadiazolidine - 3 - ones of the formula:

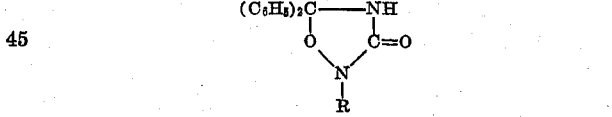

wherein R is a member of the group consisting of hydrogen and lower alkyl radicals.

2. 5,5-diphenyl-1,2,4-oxadiazolidine-3-one.

3. 5,5-diphenyl-2-methyl-1,2,4-oxadiazolidine-3-one.

4. The method of preparing 5,5-diphenyl-1,2,4-oxadiazolidine-3-one which comprises reacting diphenylketimine with phosgene to form diphenylmethylenecarbamyl chloride and reacting the diphenylmethylenecarbamyl chloride so formed with hydroxylamine.

5. The method of preparing 5,5-diphenyl-2-methyl-1,2,4-oxadiazolidine-3-one which comprises methylating 5,5 - diphenyl - 1,2,4 - oxadiazolidine - 3 - one with diazomethane.

No references cited.